(12) United States Patent
Bendak et al.

(10) Patent No.: US 6,961,350 B1
(45) Date of Patent: Nov. 1, 2005

(54) SYSTEM AND METHOD FOR SEGMENTING A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 950 days.

(21) Appl. No.: 09/745,370

(22) Filed: Dec. 22, 2000

(51) Int. Cl.[7] .............................................. H04J 3/22
(52) U.S. Cl. ...................... 370/474; 370/278; 370/503
(58) Field of Search ................................ 370/389, 392, 370/395.1, 395.21, 395.3, 395.6, 465, 470, 370/471, 472, 476, 278, 474, 503, 252; 714/746, 714/751; 375/259

(56) References Cited

U.S. PATENT DOCUMENTS

| | | | |
|---|---|---|---|
| 5,251,205 A | | 10/1993 | Callon et al. |
| 5,490,252 A | | 2/1996 | Macera et al. |
| 5,555,477 A | * | 9/1996 | Tomooka et al. ........... 398/164 |
| 5,568,471 A | | 10/1996 | Hershey et al. |
| 5,661,763 A | | 8/1997 | Sands |
| 5,666,108 A | | 9/1997 | Duffy |
| 5,710,756 A | * | 1/1998 | Pasternak et al. ........... 370/216 |
| 5,717,689 A | * | 2/1998 | Ayanoglu .................... 370/349 |
| 5,778,000 A | | 7/1998 | Dosiere et al. |
| 5,793,976 A | | 8/1998 | Chen et al. |
| 5,835,710 A | * | 11/1998 | Nagami et al. ............. 370/351 |
| 5,854,699 A | | 12/1998 | Olshansky |
| 5,875,396 A | | 2/1999 | Stockton et al. |
| 5,982,743 A | | 11/1999 | Kusano |
| 6,006,069 A | | 12/1999 | Langston |
| 6,657,967 B1 | * | 12/2003 | Fujisawa et al. ............ 370/242 |
| 6,658,006 B1 | * | 12/2003 | Chen et al. ............... 370/395.1 |
| 6,675,340 B1 | * | 1/2004 | Hardie et al. ............... 714/751 |
| 2003/0112878 A1 | * | 6/2003 | Kloper ....................... 375/259 |

* cited by examiner

*Primary Examiner*—John Pezzlo
(74) *Attorney, Agent, or Firm*—INCAPLAW; Terrance A. Meador

(57) ABSTRACT

A system and method have been provided to segment communications between relay nodes in a network using digitally wrapped, or frame structure communications. The overhead bytes in the frame are given special functions, to enable processes such as synchronization or an auxiliary communications channel. Overhead byte quantities, locations, values, or combinations of the above are used to signal the processes. Nodes in the network can be selectively programmed to recognize the overhead byte signals that trigger the processes.

46 Claims, 4 Drawing Sheets

SYSTEM AND METHOD FOR SEGMENTING A MULTIDIMENSIONAL DIGITAL FRAME STRUCTURE

BACKGROUND OF THE INVENTION

1. Field of the Invention

This invention relates generally to digitally wrapped communications and, more particularly, to a system and method for differentiating communications intended for a plurality of destinations.

2. Description of the Related Art

Frame synchronization is used in most communication technologies where extra bandwidth is required to add functionality into the original data stream. There is no standard practice with respect to the bandwidth allocation of frame synchronization words. Neither is there a practice to customize the use of that bandwidth and synchronization thresholding, adaptive to various bit error rate conditions in a variable rate forward error correction (FEC) system implementing an interleaved multi-frame superframe.

It would increase bandwidth if all the bytes, or words of a digital frame structure could be devoted to payload. However, a significant portion of the frame is devoted to FEC to remove errors that are introduced in data transmission lines. Even fiber optic systems can be noisy enough to introduce errors, when the distance between nodes is great enough. Part of the frame must also be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the quantity, location, or value of frame synchronization bytes. Hardware devoted to any particular protocol or implementation quickly becomes obsolete. An exclusively software approach to managing communications is cumbersome.

Maintenance functions must also be performed between the various nodes of a communication system. However, it is very inconvenient and cumbersome if the digitally wrapped communication must be decoded and encoded again for relay to another node, just to recover maintenance instructions. Overhead for in-band communications and control is commonly used in communication technologies. However, there is no standard practice for creating a communication hierarchy within a variable rate FEC encoded channel for interleaved superframes.

Security is another issue that has not been completely addressed in digitally wrapped communications. Typically, communications to an intended node are relayed through a plurality of relay nodes. The path, or the chain of relay nodes is often not predetermined. In many circumstances it would be desirable to provide information to a preferred node, or set of nodes, that would not be available to all the relay nodes.

It would be advantageous if communication hardware could be developed that permitted flexibility in defining the frame synchronization bytes, so as to permit the hardware to be used in a number of communication standards.

It would be advantageous if the quantity, location, and bit error rates of the overhead bytes could be made selectable to accommodate a number of communication standards, or changes to existing standards.

It would be advantageous if the above-mentioned selectable overhead bytes could be used for adding maintenance and security features into digitally wrapped communications.

SUMMARY OF THE INVENTION

Accordingly, an integrated circuit (IC) relay device is described that has programmable features to permit network segmentation. The network segmentation either permits or restricts communications between different points in that network.

More specifically, the relay IC features include:
the creation of a hierarchy or segmentation that cross-references processes with programmable overhead bytes;
programmable scrambling coverage; and
programmable FEC coverage.

The relay IC provides a function programmable framing structure for a FEC encoded channel interleaved to a plurality of levels with a multi-frame superframe. The structure permits the separation of a network into various parts by means of the frame synchronization words, and facilitates the communication between different points in the network by creating a hierarchy from the available overhead.

The invention permits segmentation of the network into different sections and selectively provides permission to receive transmissions. The invention also sets up different layers of communication between devices in the network. It does this by permitting the user to assign functionality and identity to overhead bytes.

Also provided is a method for segmenting a digital frame structure. The method comprises: defining a hierarchical order in the overhead section of digital frame structure communications; and, processing communications in response the hierarchical order of overhead section bytes. The processes include synchronization, scrambling, forward error correction, and node segmented channel communication. The hierarchical order is defined in response to characteristics such as the quantity of overhead bytes, the location of overhead bytes, and the value of overhead bytes. Additional details of the method and the above-described IC relay are described below.

DETAILED DESCRIPTION OF THE PREFERRED EMBODIMENTS

Figure 1:
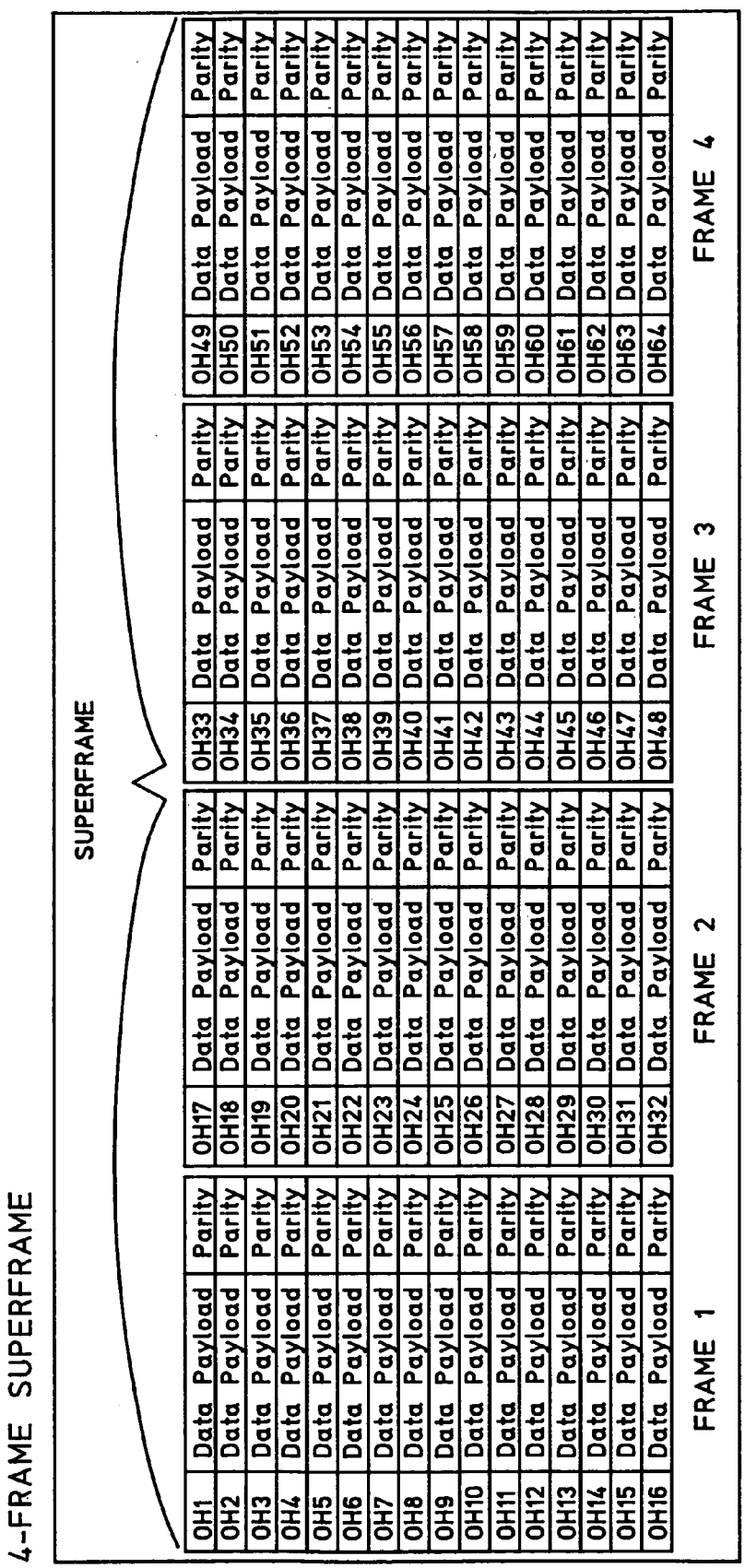
FIG. 1 illustrates a 4-frame superframe or digital wrapper structure.

FIG. 1 illustrates a 4-frame superframe or digital wrapper structure. In accordance with the present invention, this structure allocates bandwidth for 64 overhead bytes that can be used for various functions within a network, i.e. data communication channels, trace messages, NMS (network management system) to NMS communication, etc. In a network with multiple nodes, these overhead bytes can be used to create a hierarchy for communicating between different points in the network.

As can be seen from examining Frame 1, each frame is considered to be multidimensional because it includes a plurality of rows, where each row includes an overhead byte, payload bytes, and parity (FEC) bytes. The present invention is not limited to any particular quantity of bytes to the overhead, payload, and FEC sections, or to any particular number of rows. The multidimensional frame structure is also referred to as a digital wrapper.

Figure 2:
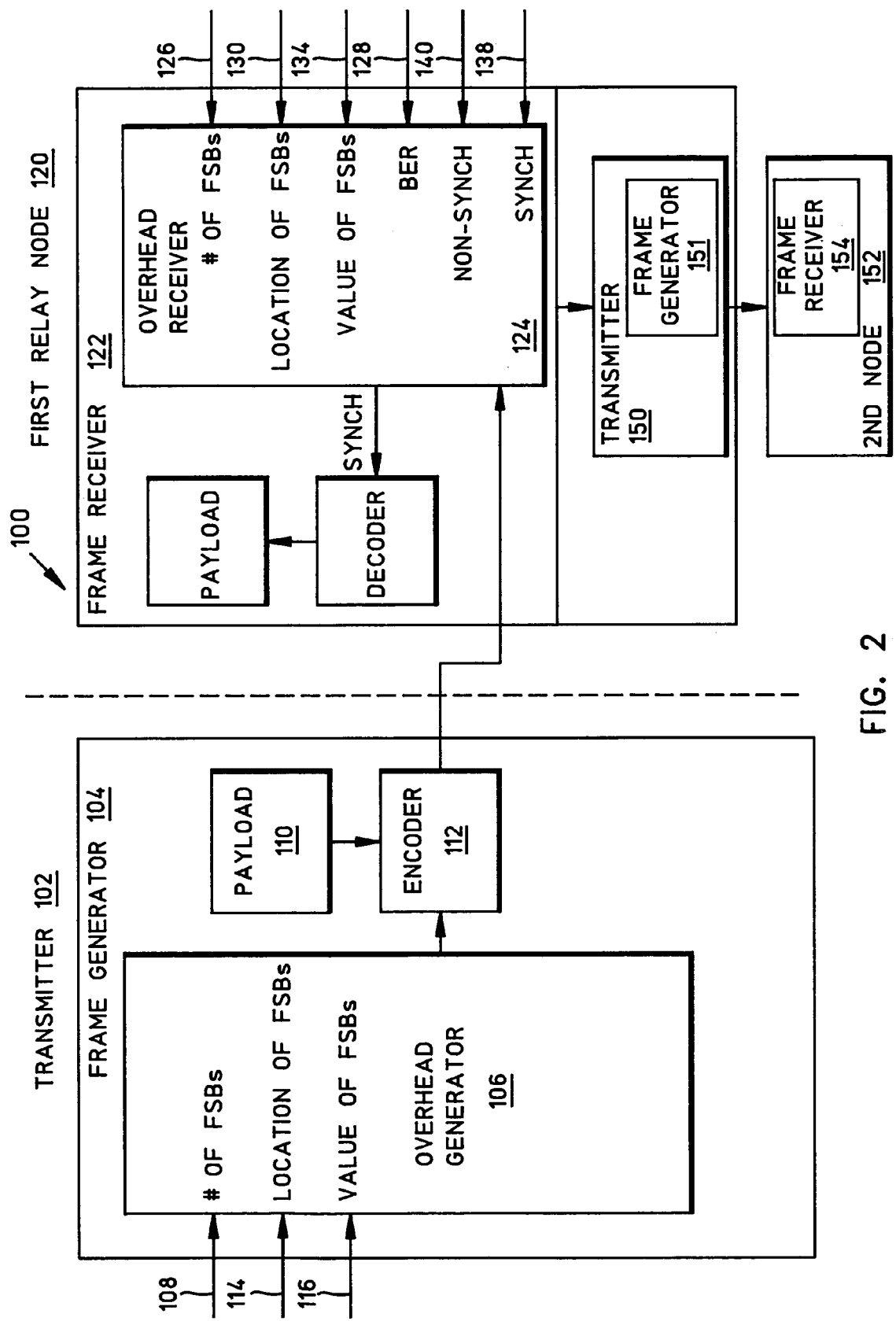
FIG. 2 is a schematic block diagram of a system for segmenting communications in a multidimensional digital frame structure.

FIG. 2 is a schematic block diagram of a system for segmenting communications in a multidimensional digital frame structure. The system 100 comprises a transmitter 102 with a frame generator 104. The frame generator 104 includes an overhead generator 106 having an input to accept commands on line 108 for selecting the quantity of overhead bytes in the overhead section of a frame. A payload generator 110 supplies the information that is to be transmitted. The information can be generated at the transmitter 102, or it can be the payload of a previously received frame. In this case, the transmitter 102 would be acting as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. Commands to select overhead byte locations are accepted on line 114, and commands to select overhead byte values are accepted on line 116.

Alternately stated, functionality in the overhead section of a frame is provided in response to selecting overhead bytes. A relationship can be established between overhead byte configurations of quantity, location, and value, and a function or process performed in response to the configuration.

It should be understood that the total quantity of overhead bytes is typically predetermined, in FIG. 1 each frame is shown to have sixteen overhead bytes. The location, and values of overhead bytes within this section may be selected to provide the hierarchical functions of the present invention. Overhead bytes can be selectively scrambled to provide a system hierarchy between nodes. In some aspects of the invention, just certain frames are used to establish a hierarchy of communication processes. The above-mentioned transmitter elements may be part of hardware sections with other uses. Further, these elements may be enabled with software, or combinations of hardware and software.

The system 100 includes a first relay node 120 with a frame receiver 122. The frame receiver 122 includes an overhead receiver 124 with an input on line 126 to accept commands for selecting the quantity of overhead bytes in the overhead section. Typically, the overhead receiver 124 uses some of these overhead bytes (frame synchronization bytes) to synchronize the frame. In other aspects of the invention, the frame synchronization function is performed by other elements of the frame receiver 122 (not shown). Once the FSBs have been identified, synchronization is possible. The frame can be decoded and the payload identified. In some aspects of the invention, the first relay node 120 is part of a relay, and the payload is relayed as is, or modified before it is retransmitted. Commands to accept FSB bit error rates are accepted on line 128, commands to accept FSB locations are accepted on line 130, and commands to accept FSB values are accepted on line 134.

The overhead receiver 124 includes an input to accept commands for the selection of a hierarchical order in the overhead section of received digital frame structure communications. More specifically, the overhead receiver 124 accepts commands on lines 126, 130, and 134. The hierarchy is determined by selecting overhead byte configurations. When the frame receiver 122 receives communications with overhead byte configurations that match the selected configurations, then the frame receiver 122 enables communication processes in response to the selected hierarchy or overhead byte configurations. Thus, the overhead is used to selectively add communication processes, beyond synchronization.

The frame receiver 122 processes communications selected from the group including synchronization, parity, scrambling, forward error correction, and node segmented channel communication. Multiple processes can be enabled simultaneously. The overhead receiver 124 selects a hierarchy in response to overhead section byte configurations, or characteristics selected from the group including the quantity of overhead bytes, the location of overhead bytes, and the value of overhead bytes.

For example, the overhead receiver 124 selects a hierarchy in response to accepting commands on line 130 to select overhead byte locations from a plurality of byte locations. Using the example of FIG. 1, a byte location in Frame 1 could be any one of the sixteen overhead bytes. The byte location can be combinations of the sixteen locations, OH1, OH2, and OH3 for example. Further, the location can be defined as overhead bytes across a span of multiple frames, or even multiple superframes. Regardless, the frame receiver 122 can process communications in response to the selected overhead byte locations.

Likewise, the overhead receiver 124 selects a hierarchy in response to accepting commands on line 126 selecting a quantity of overhead bytes in the span of a frame, or across frames. In some aspects of the invention, a specific quantity of consecutive overhead bytes, or a specific quantity of a certain byte values may act as a triggering configuration. In other aspects, the quantity of bytes in the entire overhead section of a row, sub-frame, or frame may be manipulated. For example, overhead bytes selected for a first function may be selectively used for a second function. In a more specific example, FSB bytes can be robbed to provide an auxiliary communications channel, with the receiver occasionally missing a frame synchronization. Further, the hierarchy can be selected in response to the value of overhead bytes selected in response to commands on line 134. More typically, the configuration of overhead bytes that selects a hierarchy is a combination of byte quantity, location, and value. For example, a hierarchy can be selected by a byte value of 00 in byte location OH1 and a value of FF in locations OH2 and OH3.

In one aspect of the invention, the overhead receiver 124 selects a hierarchy in response to selecting a first configuration of overhead bytes and a second configuration of overhead bytes. When communications are received with matching configurations, the frame receiver 122 processes communications with a first process in response to the first configuration, and in a second process in response to the second configuration. Using the previously-mentioned example, synchronization can be accomplished using the 00 value in location OH1. The bytes in locations OH2 and OH3 can be unscrambled bytes that can be read, or read and replaced, without the necessity of descrambling and rescrambling the entire frame. In this manner, the second configuration of overhead bytes forms an auxiliary communication channel. A hierarchy with a plurality of overhead byte configurations-n be selected with the overhead receiver 124 that permits the frame receiver to perform a plurality of processes responsive to the plurality of configurations. As mentioned-above, the overhead receiver 124 selects a hierarchy in response to selecting a plurality of byte locations, quantities of overhead bytes, overhead byte value configurations, as well as configurations based upon combinations of quantity, location, and value.

Different levels of the hierarchy can be separated by physical location within the available overhead space, or by the amount of processing it takes to access that data. Examples of this processing separation are in the Forward Error Correction (FEC), BIP-8 calculations, and scrambling. This is done using the programming structure shown in Table 1. The structure also allows the overhead's type and its location to be set.

TABLE 1

| ADDR = 0–63: OH Properties | | | | | | | | | | | | | | | | |
|---|---|---|---|---|---|---|---|---|---|---|---|---|---|---|---|---|
| ADDR = 0x???: OH#1 of a Superframe | | | | | | | | | | | | | | | | |
| Bit | 15 | 14 | 13 | 12 | 11 | 10 | 9 | 8 | 7 | 6 | 5 | 4 | 3 | 2 | 1 | 0 |
| Name | Unused | | | | | | | FEC Parity Bytes BIP-8 Covered | Descram | FEC Covered | BIP-8 Covered | OH Type | | | | |
| Mode | ro | ro | ro | ro | ro | ro | ro | rw | rw | rw | rw | rw | rw | rw | rw | rw |
| ADDR = 63: OH#63 of a Superframe | | | | | | | | | | | | | | | | |
| Bit | 15 | 14 | 13 | 12 | 11 | 10 | 9 | 8 | 7 | 6 | 5 | 4 | 3 | 2 | 1 | 0 |
| Name | Unused | | | | | | | FEC Parity Bytes BIP-8 Covered | Descram | FEC Covered | BIP-8 Covered | OH Type | | | | |
| Mode | ro | ro | ro | ro | ro | ro | ro | rw | rw | rw | rw | rw | rw | rw | rw | rw |

Some specific examples follow which use the location configuration to select hierarchy. However, it should be understood that these examples could be enabled using quantities of bytes, byte values, or combination of location, quantity, and value. For example, the overhead receiver 124 can select a hierarchy in response to selecting a location in a frame overhead section. Then, the frame receiver 122 performs forward error correction on the overhead bytes in the selected location. Alternately, the frame receiver 122 could descramble the overhead bytes in the selected location.

In some aspects of the invention, the overhead receiver 124 accepts commands to select a hierarchy in response to first and second location configurations in the frame overhead section. Then, the frame receiver 122 forward error corrects overhead bytes in the first location, but not in the second location. Alternately, the overhead receiver 124 can modify bytes in the first location, but not the second location, if the bytes in the second location are covered by FEC and the decoder is unable to perform FEC functions.

Some segmenting aspects of the invention are better understood in the context of multiple receiving nodes. First relay node 120 includes a transmitter 150 and overhead generator 151 similar to transmitter 102 and frame generator 104. Also shown is a second relay node 152 with a frame receiver 154 similar to the frame receiver 122 described above. In system 100 it may be desired to send control and status information from the transmitter 102 to the second node 152 without having it being modified or monitored at the first relay node 120. However, this segmented or hierarchical communication order must still permit communications between the transmitter 102 and the first relay node 120, as the first relay node 120 intervenes between transmitter 102 and second node 152.

NOTE: The bit definitions for 'OH Properties' registers are as follows.

| Bit Positions | Function | Description |
|---|---|---|
| 15:9 | Unused | |
| 8 | FEC Parity Bytes BIP-8 Covered | 0: Do not include the parity bytes of this FEC subframe in BIP-8 calculation<br>1: Include the parity bytes of this FEC subframe in BIP-8 calculation |
| 7 | Descram | 0: Do not descramble this byte<br>1: Descramble this byte |
| 6 | FEC Covered | 0: Substitute 0's for this byte for FEC calculations<br>1: Include this byte in FEC calculations |
| 5 | BIP-8 Covered | 0: Do not include this byte in BIP-8 calculations<br>1: Include this byte in BIP-8 calculations |
| 4:0 | OH Type | 00000: None<br>00001: DCC1 byte<br>00010: DCC2 byte<br>00011: DCC3 byte<br>00100: J0 byte<br>00101: J1 byte<br>00110: J2 byte<br>00111: J0, J1, J2<br>01000: J0, J1<br>01001: J0, J2<br>01010: J1, J2<br>01011: MFAS<br>01100: K1 byte<br>01101: K2 byte<br>01110: S1 byte<br>01111: BIP-8 byte<br>10000: M1<br>1xxxx: The remainder are reserved |

If communication between the transmitter 102 and second node 152 are FEC covered, bits are protected from corruption, and the second node can detect whether the data was modified by the first node 120. The data can also be set as scrambled so that the first node 120 must descramble the data to make it usable. This scrambling creates one level of the hierarchy.

Communication between the transmitter 102 and the first node 120 can utilize overhead bytes unused in communications to the second node 152. To ease the hardware demands, the overhead bytes used for communicating can be placed outside of the FEC and scrambling. This allows the first node 120 to modify overhead locations within the frame structure without having to descramble and recalculate the FEC parity bytes. These actions create another level of hierarchy. Many related variations in layering can be created.

Aside from the flexibility in the communication overhead bytes, there is a great deal of flexibility in the frame synchronization bytes (FSBs) that can be used to segment the network into sections. Control of the FSBs is a method of selectively giving permission to the various nodes in the system to receive the transmission. For example, the transmitter 102 may send communications with FSBs that can be used to synchronize communications at one node, but not the other. In this manner receivers are selectively given permission to receive certain transmissions. This selective FSB feature has applications where the only items that distinguish two different sources are the data they send. The FSBs are programmable in position, quantity, and value.

In a wave division multiplexed (WDM) network, a single fiber strand can carry different transmissions from several sources. By assigning different FSBs to each transmission, it is guaranteed that a receiver cannot "accidentally" receive a transmission not intended for it. Furthermore, it is possible to segment which receivers in the network domain 100 receive a transmission, by indicating only a subset of the FSBs to acquire on.

In one example, the first node 120 and the second relay node 152 accept communications including a frame overhead section defining a hierarchy with a first byte location and a second byte location. That is, the second node receives a communication from transmitter 102 via first node relay 120. The first node overhead receiver 124 includes an input to select the first byte location, and the first node frame receiver 122 performs a first communication process in response to the bytes in the first location. Likewise, the second node overhead receiver (not shown) includes an input to select the second byte location, and the second node frame receiver 154 performs a second communication process in response to the bytes in the second location.

In a more explicit example, the first node frame receiver 122 receives a frame with a first forward error correction (FEC). Referring to FIG. 1, the first FEC may be the FEC section of a row, several rows (sub-frame), several frames, or even several superframes. The first node frame receiver 122 substitutes overhead bytes in the second location. For example, the first FEC section may include all the FEC sections of Frame 1. The overhead receiver 124 may receive commands that indicate that overhead bytes OH1 and OH2 have not been covered by the FEC protection. This permits the bytes to be read and replaced without performing decoding and encoding operations. Overhead bytes OH1 and OH2 can provide maintenance information specifically designated for the first node 120. The first node frame generator 151 transmits a frame with the substituted overhead bytes to the second node receiver 152, and the second node frame receiver 154 receives the frame with the first forward error correction.

In another example, the first node frame receiver 122 receives a frame with bytes scrambled in the first location and non-scrambled bytes in the second location. Using the above example, the first location can be OH1 and OH2, while the second location can be OH3. The first node frame receiver 122 reads the overhead bytes in the second location, and the first node frame generator 151 transmits the frame with the scrambled bytes in the first location to the second node frame receiver 154. The second node frame receiver 154 receives the frame with the scrambled bytes in the first location. Once again, overhead bytes can be recovered from communications at the first node without the necessity of descrambling the digitally wrapped information. In some aspects of the invention, the first node frame generator 151 replaces the overhead bytes in the second location, and transmits the frame with the scrambled overhead bytes in the first location.

Figure 3:
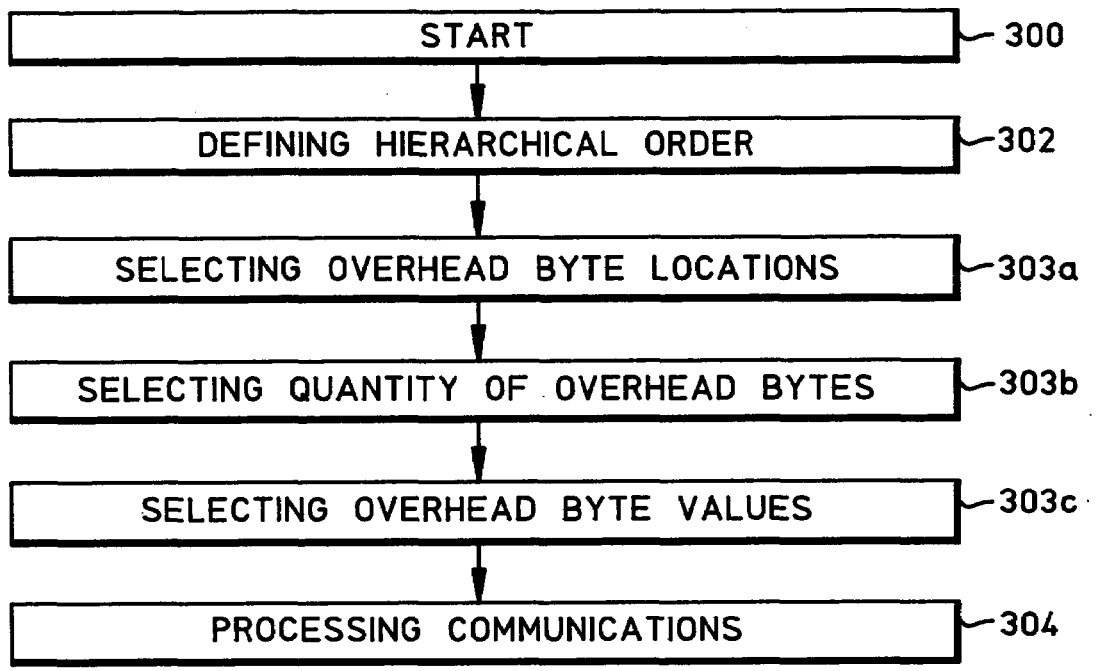
FIG. 3 is a flowchart depicting a method for segmenting a digital frame structure.

FIG. 3 is a flowchart depicting a method for segmenting a digital frame structure. Although the method is depicted as a series of numbered steps for clarity, no order should be inferred unless explicitly stated. The method begins with Step 300. Step 302 defines a hierarchical order in the overhead section of digital frame structure communications. Step 304 processes communications in response the hierarchical order of overhead section bytes.

In some aspects of the invention, processing communications in response to the hierarchical order of overhead section bytes in Step 304 includes processes selected from the group including synchronization, scrambling, forward error correction, parity corrections, and node segmented channel communication.

In some aspects, defining a hierarchical order in the overhead section of digital frame structure communications in Step 302 includes defining a frame overhead section in response to characteristics selected from the group including the quantity of overhead bytes, the location of overhead bytes, and the value of overhead bytes.

In some aspects, defining a hierarchical order in the overhead section of digital frame structure communications in Step 302 includes defining a frame overhead section with a plurality of byte locations. The method comprises a further step. Step 303a selects overhead byte locations from the plurality of byte locations. Processing communications in response to the overhead section bytes in a hierarchical order in Step 304 includes processing in response to the selected overhead byte locations.

In some aspects of the invention, defining a hierarchical order in the overhead section of digital frame structure communications in Step 302 includes defining an overhead section with a plurality of overhead byte quantities. The method comprises a further step. Step 303b selects a quantity of overhead bytes from the plurality of overhead byte quantities. Processing communications in response to the hierarchical order of overhead section bytes in Step 304 includes processing in response the selected quantity of overhead bytes.

In some aspects, defining a hierarchical order in the overhead section of digital frame structure communications in Step 302 includes defining an overhead section with a plurality of overhead byte values. The method comprises a further step. Step 303c selects overhead byte values from the plurality of overhead byte values. Processing communications in response to the hierarchical order of overhead section bytes in Step 304 includes processing in response the selected overhead byte values.

In some aspects of the invention, defining a hierarchical order in the overhead section of digital frame structure communications in Step 302 includes defining an overhead section with a first configuration of overhead bytes and a second configuration of overhead bytes. Processing communications in response to the hierarchical order of overhead section bytes in Step 304 includes processing communications in a first process in response to the first configuration of overhead bytes and processing communications in a second process in response to the second configuration of overhead bytes.

In some aspects, defining a hierarchical order in the overhead section of digital frame structure communications in Step 302 includes defining an overhead section with a plurality of overhead byte configurations. Processing communications in response to the hierarchical order of overhead section bytes in Step 304 includes processing communications in a plurality of processes in response to the plurality of overhead byte configurations.

In some aspects, defining a hierarchical order in an overhead section with a plurality of byte locations in Step 302 includes defining a hierarchical order in response to the configuration of overhead byte locations. Selecting overhead byte locations from the plurality of byte locations in Step 303a includes selecting a first configuration. Processing communications in response to the hierarchical order of overhead section bytes in Step 304 includes selecting a first process in response to the first configuration.

In some aspects, defining a hierarchical order in response to the configuration of overhead byte locations in Step 302 includes defining an overhead section with a plurality of byte location configurations. Selecting overhead byte locations from the plurality of byte locations in Step 303a includes selecting a plurality of byte location configurations. Processing communications in response to the hierarchical order of overhead section bytes in Step 304 includes selecting a plurality of processes in response to the plurality of configurations.

In some aspects of the invention, defining a hierarchical order in response to the configuration of overhead byte locations in Step 302 includes defining an overhead section with a first byte location configuration and a second byte location configuration. Selecting overhead byte locations from the plurality of byte locations in Step 303a includes selecting a first and a second configuration. Processing communications in response to the hierarchical order of overhead section bytes in Step 304 includes selecting a first process in response to the first configuration and a second process in response to the second configuration.

In some aspects of the invention, defining a hierarchical order in an overhead section with a plurality of overhead byte quantities in Step 302 includes defining a hierarchical order in response to configurations of overhead byte quantities. Selecting the overhead byte quantities from the plurality of byte quantities in Step 303b includes selecting a first configuration. Processing communications in response to the hierarchical order of overhead section bytes in Step 304 includes selecting a first process in response to the first configuration.

In some aspects, defining a hierarchical order in Step 302 includes defining an overhead section with a plurality of configurations of overhead byte quantities. Selecting the quantity of overhead bytes from the plurality of byte quantities in Step 303b includes selecting a plurality of configurations. Processing communications in response to the hierarchical order of overhead section bytes in Step 304 includes selecting a plurality of processes in response to the plurality of configurations.

In some aspects of the invention, defining a hierarchical order in response to configuration of overhead byte quantities in Step 302 includes defining an overhead section with a first configuration and a second configuration. Selecting the quantity of overhead bytes from the plurality of byte quantities in Step 303b includes selecting a first and a second configuration. Processing communications in response to the hierarchical order of overhead section bytes in Step 304 includes selecting a first process in response to the first configuration and a second process in response to a second configuration.

In some aspects of the invention, defining a hierarchical order in an overhead section with a plurality of byte locations in Step 302 includes defining a hierarchical order in response to the configuration of overhead byte values. Selecting overhead byte values from the plurality of byte values in Step 303c includes selecting a first configuration. Processing communications in response to the hierarchical order of overhead section bytes in Step 304 includes selecting a first process in response to the first configuration.

In some aspects of the invention, defining a hierarchical order in response to the configuration of overhead byte values in Step 302 includes defining an overhead section with a plurality of byte value configurations. Selecting overhead byte values from the plurality of byte values in Step 303c includes selecting a plurality of byte value configurations. Processing communications in response to the hierarchical order of overhead section bytes in Step 304 includes selecting a plurality of processes in response to the plurality of configurations.

In some aspects of the invention, defining a hierarchical order in response to the configuration of overhead byte values in Step 302 includes defining an overhead section with a first configuration and a second configuration. Selecting overhead byte values from the plurality of byte values in Step 303c includes selecting a first and a second configuration. Processing communications in response to the hierarchical order of overhead section bytes in Step 304 includes selecting a first process in response to the first configuration and a second process in response to the second configuration.

In some aspects, defining a hierarchical order in the overhead section of digital frame structure communications in Step 302 includes selecting a predetermined location in a frame overhead section. Processing communications in response the hierarchical order of overhead section bytes in Step 304 includes forward error correcting the overhead bytes in the selected location.

In some aspects of the invention, defining a hierarchical order in the overhead section of digital frame structure communications in Step 302 includes selecting a predetermined location in a frame overhead section. Processing communications in response to the hierarchical order of overhead section bytes in Step 304 includes scrambling the overhead bytes in the selected location. Note, the above two examples could also be enabled using byte value or byte quality configurations.

Figure 4:
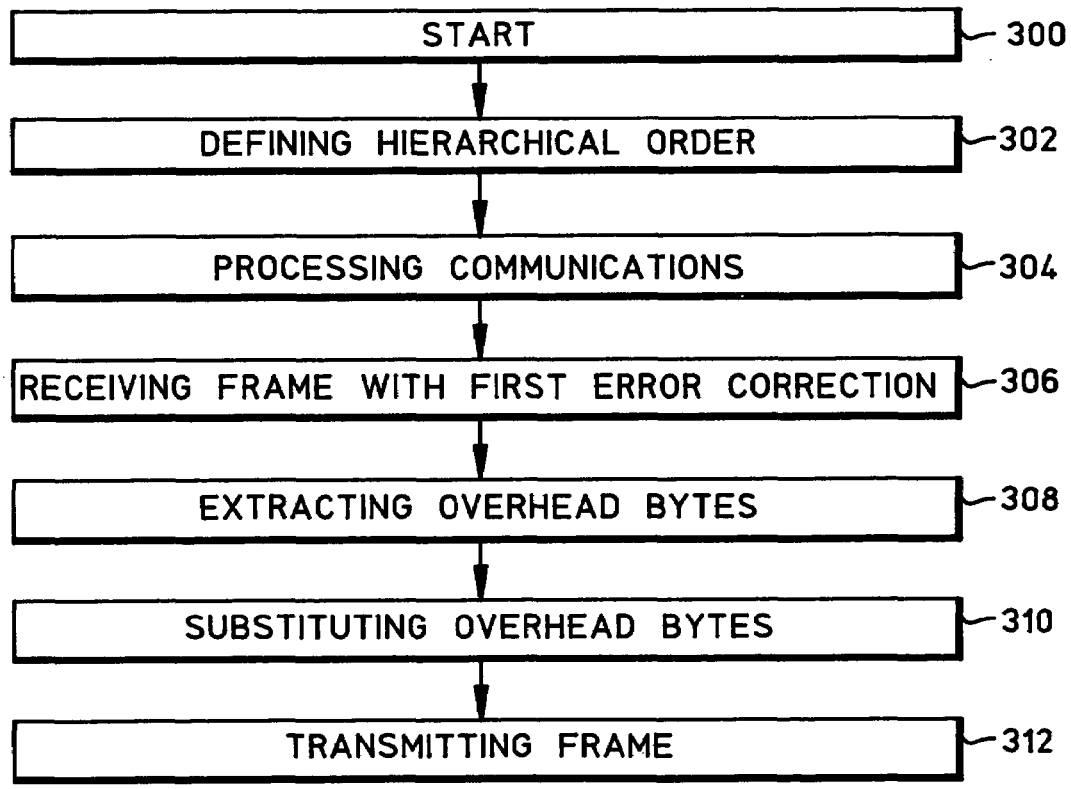
FIG. 4 is a flowchart illustrating a FEC segmentation aspect of this invention.

FIG. 4 is a flowchart illustrating a FEC segmentation aspect of this invention. In some aspects, defining a hierarchical order in the overhead section of digital frame structure communications in Step 302 includes selecting a first location and a second location in a frame overhead section. Processing communications in response to the hierarchical order of overhead section bytes in Step 304 includes forward error correcting overhead bytes in the first location and not forward error correcting overhead bytes in the second location. In this situation, it is typical that the bytes in the first location have been covered with FEC at transmission.

Step 306 receives the frame with a first error correction value. Step 308 extracts the overhead bytes in the second location. Step 310 substitutes overhead bytes in the second location. Step 312 transmits the frame with the first error correction value.

Figure 5:
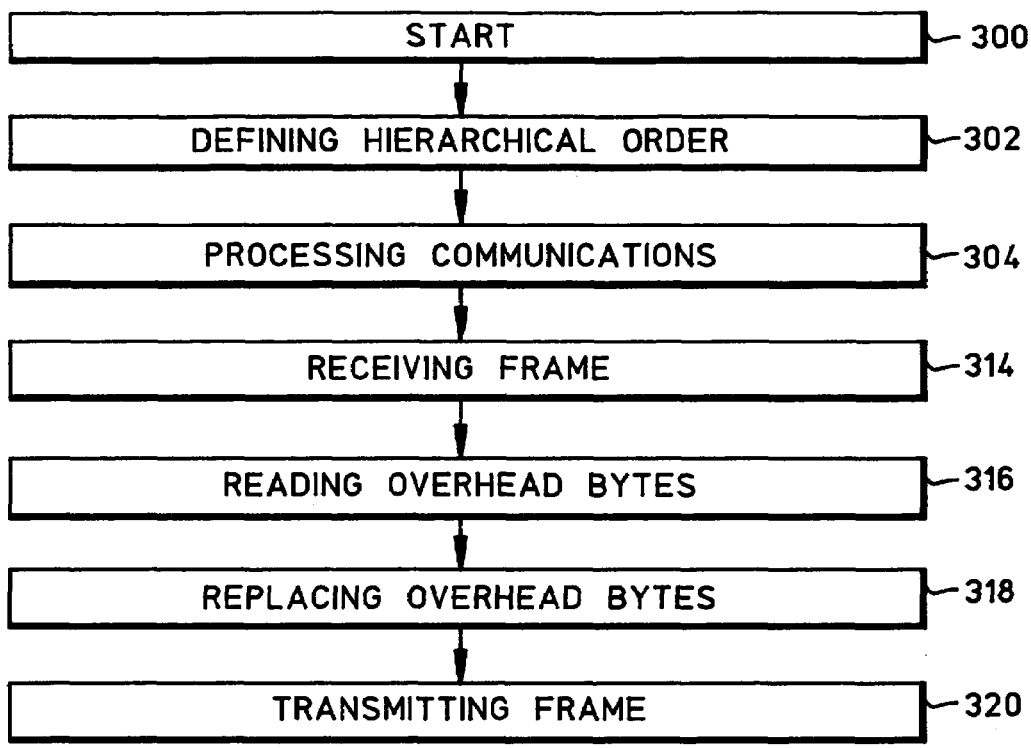
FIG. 5 is a flowchart illustrating a scrambling segmentation aspect of the invention.

FIG. 5 is a flowchart illustrating a scrambling segmentation aspect of the invention. In some aspects of the invention, defining a hierarchical order in the overhead section of digital frame structure communications in Step 302 includes selecting a first location and a second location in a frame overhead section. Processing communications in response the hierarchical order of overhead section bytes in Step 304 includes scrambling overhead bytes in the first location and not scrambling overhead bytes in the second location.

Some aspects of the invention include further steps. Step 314 receives the frame. Step 316 reads the overhead bytes in the second location. Step 318 replaces the overhead bytes in the second location. Step 320 transmits the frame with the scrambled overhead bytes in the first location.

Figure 6:
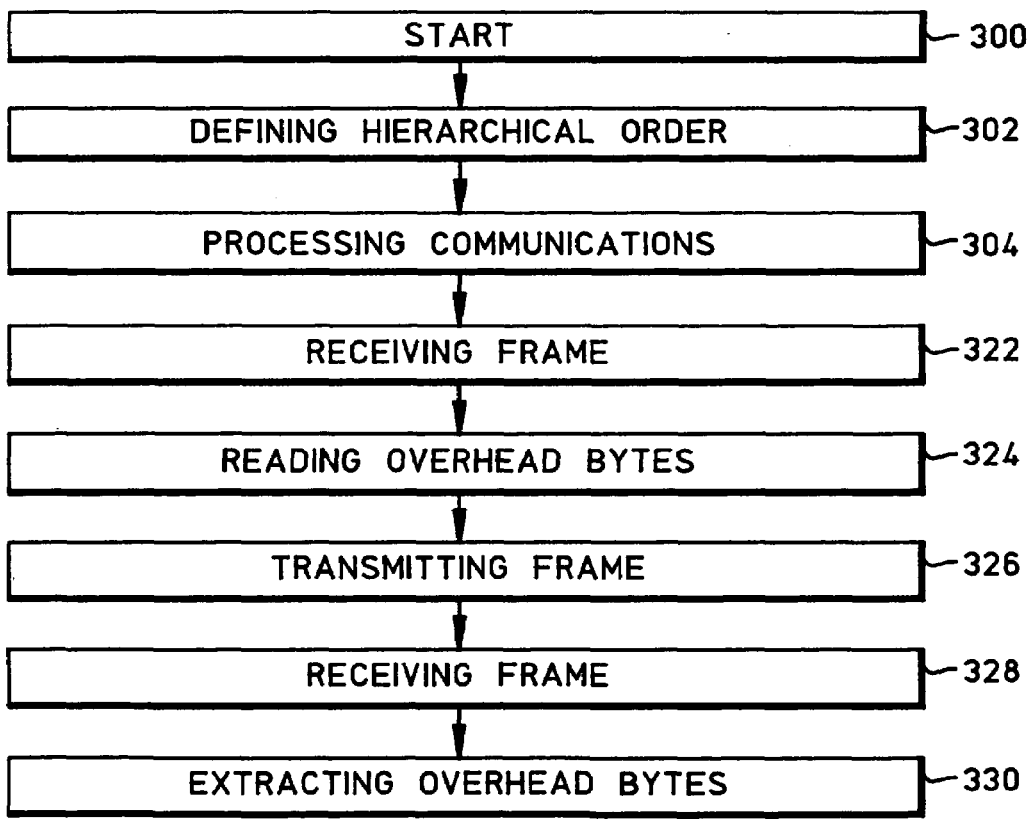
FIG. 6 is a flowchart illustrating an auxiliary communication channel aspect of the invention.

FIG. 6 is a flowchart illustrating an auxiliary communication channel aspect of the invention. In some aspects of the invention, defining a hierarchical order in the overhead section of digital frame structure communications in Step 302 includes selecting a first location and a second location in a frame overhead section. Processing communications in response the hierarchical order of overhead section bytes in Step 304 includes processing the overhead bytes of the first location at a first node and processing the overhead bytes of the second location at a second node.

Step 322 receives the frame at the first node. Step 324 reads the overhead bytes in the first location. Step 326 transmits the frame with the overhead bytes in the first and second locations from the first node. Step 328 receives the frame at a second node. Step 330 extracts the overhead bytes in the second location.

A system and method have been provided for establishing layered communications to different nodes in the same network. Although a simple example has been given with two receiver nodes, the invention is also applicable to a network of many nodes. Although specific processes of synchronization, scrambling, FEC, and an auxiliary communications link have been given as examples, the present invention is applicable to other selectable engagable processes. A few examples have also been given of using specific arrangements of overhead bytes to signal the segmentation. Specifically, the quantity, location, values, and a some combinations have been provided, but many other variations in the overhead section of a frame can be used as a signal. It would be possible to create other arrangements in the overhead, payload, and FEC section of a frame that could be used for segmentation purposes as proposed in the this invention. Other variations and embodiments will occur to those skilled in the art.

We claim:

1. A method for processing communications in response to a digital frame structure, the method comprising:
   accepting a command for defining a hierarchical order of overhead section bytes in an overhead section in a digital frame structure;
   defining the hierarchical order in response to the command;
   receiving communications including a digital frame structure with overhead section bytes programmed by a source of the communications; and
   processing the communications if the defined hierarchical order of overhead section bytes matches overhead bytes in the programmed overhead section bytes.

2. The method of claim 1 wherein processing the communications in response to the hierarchical order of overhead section bytes includes performing a process selected from the group including synchronization, scrambling, forward error correction, and node segmented channel communication.

3. The method of claim 2 wherein defining the hierarchical order in the overhead section of digital frame structure communications includes defining a frame overhead section in response to characteristics selected from the group including the quantity of overhead bytes, the location of overhead bytes, and the value of overhead bytes.

4. The method of claim 2 wherein defining the hierarchical order in the overhead section of digital frame structure communications includes defining a frame overhead section with a plurality of byte locations; and
   the method further comprising:
   selecting overhead byte locations from the plurality of byte locations; and
   wherein processing communications in response to the hierarchical order of overhead section bytes in a hierarchical order includes processing in response to the selected overhead byte locations.

5. The method of claim 2 wherein defining the hierarchical order in the overhead section of digital frame structure communications includes defining an overhead section with a plurality of overhead byte quantities; and
   the method further comprising:
   selecting a quantity of overhead bytes from the plurality of overhead byte quantities; and
   wherein processing communications in response to the hierarchical order of overhead section bytes includes processing in response the selected quantity of overhead bytes.

6. The method of claim 2 wherein defining the hierarchical order in the overhead section of digital frame structure communications includes defining an overhead section with a plurality of overhead byte values; and
   the method further comprising:
   selecting overhead byte values from the plurality of overhead byte values; and
   wherein processing communications in response to the overhead section bytes in a hierarchical order includes processing in response the selected overhead byte values.

7. The method of claim 2 wherein defining the hierarchical order in the overhead section of digital frame structure communications includes defining an overhead section with a first configuration of overhead bytes and a second configuration of overhead bytes; and
   wherein processing communications in response to the hierarchical order of overhead section bytes includes processing communications in a first process in response to the first configuration of overhead bytes and processing communications in a second process in response to the second configuration of overhead bytes.

8. The method of claim 2 wherein defining the hierarchical order in the overhead section of digital frame structure communications includes defining an overhead section with a plurality of overhead byte configurations; and wherein processing communications in response to the hierarchical order of overhead section bytes includes processing communications in a plurality of processes in response to the plurality of overhead byte configurations.

9. The method of claim 2 wherein defining the hierarchical order in an overhead section with a plurality of byte locations includes defining a hierarchical order in response to the configuration of overhead byte locations;
wherein selecting overhead byte locations from the plurality of byte locations includes selecting a first configuration; and
wherein processing communications in response to the hierarchical order of overhead section bytes includes selecting a first process in response to the first configuration.

10. The method of claim 2 wherein defining the hierarchical order in response to the configuration of overhead byte locations includes defining an overhead section with a plurality of byte location configurations;
wherein selecting overhead byte locations from the plurality of byte locations includes selecting a plurality of byte location configurations; and
wherein processing communications in response to the hierarchical order of overhead section bytes includes selecting a plurality of processes in response to the plurality of configurations.

11. The method of claim 2 wherein defining the hierarchical order in response to the configuration of overhead byte locations includes defining an overhead section with a first byte location configuration and a second byte location configuration;
wherein selecting overhead byte locations from the plurality of byte locations includes selecting a first and a second configuration; and
wherein processing communications in response to the hierarchical order of overhead section bytes includes selecting a first process in response to the first configuration and a second process in response to the second configuration.

12. The method of claim 5 wherein defining the hierarchical order in an overhead section with a plurality of overhead byte quantities includes defining a hierarchical order in response to configurations of overhead byte quantities;
wherein selecting the overhead byte quantities from the plurality of byte quantities includes selecting a first configuration; and
wherein processing communications in response to the hierarchical order of overhead section bytes includes selecting a first process in response to the first configuration.

13. The method of claim 12 wherein defining the hierarchical order includes defining an overhead section with a plurality of configurations of overhead byte quantities;
wherein selecting the quantity of overhead bytes from the plurality of byte quantities includes selecting a plurality of configurations; and
wherein processing communications in response to the hierarchical order of overhead section bytes includes selecting a plurality of processes in response to the plurality of configurations.

14. The method of claim 13 wherein defining the hierarchical order in response to configuration of overhead byte quantities includes defining an overhead section with a first configuration and a second configuration;
wherein selecting the quantity of overhead bytes from the plurality of byte quantities includes selecting a first and a second configuration; and
wherein processing communications in response to the hierarchical order of overhead section bytes includes selecting a first process in response to the first configuration and a second process in response to a second configuration.

15. The method of claim 6 wherein defining the hierarchical order in an overhead section with a plurality of byte values includes defining a hierarchical order in response to the configuration of overhead byte values;
wherein selecting overhead byte values from the plurality of byte values includes selecting a first configuration; and
wherein processing communications in response to the hierarchical order of overhead section bytes includes selecting a first process in response to the first configuration.

16. The method of claim 15 wherein defining the hierarchical order in response to the configuration of overhead byte values includes defining an overhead section with a plurality of byte value configurations;
wherein selecting overhead byte values from the plurality of byte values includes selecting a plurality of byte value configurations; and
wherein processing communications in response to the hierarchical order of overhead section bytes includes selecting a plurality of processes in response to the plurality of configurations.

17. The method of claim 16 wherein defining the hierarchical order in response to the configuration of overhead byte values includes defining an overhead section with a first configuration and a second configuration;
wherein selecting overhead byte values from the plurality of byte values includes selecting a first and a second configuration; and
wherein processing communications in response to the hierarchical order of overhead section bytes includes selecting a first process in response to the first configuration and a second process in response to the second configuration.

18. The method of claim 1 wherein defining the hierarchical order in the overhead section of digital frame structure communications includes selecting a predetermined location in a frame overhead section; and
wherein processing communications in response to the hierarchical order of overhead section bytes includes forward error correcting the overhead bytes in the selected location.

19. The method of claim 1 wherein defining the hierarchical order in the overhead section of digital frame structure communications includes selecting a predetermined location in a frame overhead section; and
wherein processing communications in response the hierarchical order of overhead section bytes includes scrambling the overhead bytes in the selected location.

20. The method of claim 1 wherein defining the hierarchical order in the overhead section of digital frame structure communications includes selecting a first location and a second location in a frame overhead section; and
wherein processing communications in response the hierarchical order of overhead section bytes includes forward error correcting overhead bytes in the first location and not forward error correcting overhead bytes in the second location.

21. The method of claim 20 further comprising:
receiving the frame with a first error correction value;
extracting the overhead bytes in the second location;
substituting overhead bytes in the second location; and
transmitting the frame with the first error correction value.

22. The method of claim 2 wherein defining the hierarchical order in the overhead section of digital frame structure communications includes selecting a first location and a second location in a frame overhead section; and
wherein processing communications in response the hierarchical order of overhead section bytes includes scrambling overhead bytes in the first location and not scrambling overhead bytes in the second location.

23. The method of claim 22 further comprising:
receiving the frame; and
reading the overhead bytes in the second location.

24. The method of claim 23 further comprising:
replacing the overhead bytes in the second location; and
transmitting the frame with the scrambled overhead bytes in the first location.

25. The method of claim 1 wherein defining the hierarchical order in the overhead section of digital frame structure communications includes selecting a first location and a second location in a frame overhead section; and
wherein processing communications in response to the hierarchical order of overhead section bytes includes processing the overhead bytes of the first location at a first node and processing the overhead bytes of the second location at a second node.

26. The method of claim 25 further comprising:
receiving the frame at the first node; and
reading the overhead bytes in the first location.

27. The method of claim 26 further comprising:
transmitting the frame with the overhead bytes in the first and second locations from the first node;
receiving the frame at a second node; and
extracting the overhead bytes in the second location.

28. An integrated circuit (IC) relay system for processing communications in response to a digital frame structure, the system comprising:
at least a first relay node including:
a frame receiver including an overhead receiver to receive the overhead section of a frame, a payload receiver to receive the payload section of the frame, and a decoder to provide a forward error corrected (FEC) frame;
wherein the overhead receiver includes an input to accept a command to select a hierarchical order in the overhead section of received digital frame structure communications;
wherein the overhead receiver selects a hierarchical order in response to the command; and
wherein the frame receiver processes communications in response the selected hierarchy.

29. The system of claim 28 wherein the frame receiver processes communications by performing a process selected from the group including synchronization, scrambling, forward error correction, and node segmented channel communication.

30. The system of claim 29 wherein the overhead receiver selects a hierarchical order in response to overhead section byte configurations selected from the group including the quantity of overhead bytes, the location of overhead bytes, and the value of overhead bytes.

31. The system of claim 29 wherein the command is a command to select overhead byte locations from a plurality of byte locations; and
wherein the frame receiver processes communications in response to the selected overhead byte locations.

32. The system of claim 29 wherein the command is a command to select a quantity of overhead bytes from a plurality of overhead byte quantities; and
wherein the frame receiver processing communications in response to the selected overhead byte quantity.

33. The system of claim 29 wherein the overhead receiver selects a hierarchy in response to selecting overhead byte values from a plurality of overhead byte values; and
wherein the frame receiver processes communications in response to the selected overhead byte values.

34. The system of claim 29 wherein the overhead receiver selects a hierarchy in response to selecting a first configuration of overhead bytes and a second configuration of overhead bytes; and
wherein the frame receiver processes communications in a first process in response to the first configuration, and in a second process in response to the second configuration.

35. The system of claim 34 wherein the overhead receiver selects a hierarchy with a plurality of overhead byte configurations; and
wherein the frame receiver processing communications in a plurality of processes responsive to the plurality of configurations.

36. The system of claim 31 wherein the overhead receiver selects a hierarchy in response to selecting configurations from a plurality of byte location configurations; and
wherein the frame receiver processes communications in a plurality of processes responsive to the selected configurations.

37. The system of claim 32 wherein the overhead receiver select a hierarchy in response to selecting configurations from a plurality of overhead byte quantities; and
wherein the frame receiver processes communications in a plurality of processes in response to the selected configurations.

38. The system of claim 33 wherein the overhead receiver selects a hierarchy in response to selecting configurations from a plurality of overhead byte values; and
wherein the frame receiver processes communications in a plurality of processes in response to the selected configurations.

39. The system of claim 28 wherein the overhead receiver selects a hierarchy in response to selecting a location in a frame overhead section; and
wherein the frame receiver performs forward error correction of the overhead bytes in the selected location.

40. The system of claim 28 wherein the overhead receiver selects a hierarchy in response to selecting a location in a frame overhead section; and
wherein the frame receiver descrambles the overhead bytes in the selected location.

41. The system of claim 28 wherein the overhead receiver accepts commands to select a hierarchy in response to first and second location configurations in the frame overhead section; and
wherein the frame receiver forward error corrects overhead bytes in the first location, but not in the second location.

42. The system of claim 28 further comprising:
at least a second relay node including:
a frame receiver including an overhead receiver to receive the overhead section of a frame, a payload receiver to receive the payload section of the frame, and a decoder to provide a forward error corrected (FEC) frame;

wherein the overhead receiver includes an input to accept a command for selecting a hierarchical order in the overhead section of received digital frame structure communications;

wherein the overhead receiver selects a hierarchical order in response to the command; and wherein the first and second relay nodes accept communications including a frame overhead section defining a hierarchy with a first byte location and a second byte location;

wherein the input of the first node overhead receiver is an input for accepting a first command to select the first byte location;

wherein the first node frame receiver performs a first communication process in response to the bytes in the first location;

wherein the input of the second node overhead receiver is an for accepting a second command to select the second byte location; and wherein the second node frame receiver performs a second communication process in response to the bytes in the second location.

43. The system of claim 42 further comprising:

a first relay node transmitter including:

a frame generator including an overhead generator to generate the overhead section of a frame, a payload generator to generate the payload section of the frame, and an encoder to provide forward error correction for the frame; and wherein the overhead generator includes an input for accepting a command to select the hierarchical order in the overhead section.

44. The system of claim 43 wherein the first node frame receiver receives a frame with a first forward error correction;

wherein the first node frame receiver substitutes overhead bytes in the second location;

wherein the first node frame generator transmits a frame with the substituted overhead bytes to the second node receiver; and wherein the second node frame receiver receives the frame with the first forward error correction.

45. The system of claim 43 in which the first node transmitter has an output connected to the input of the second node receiver;

wherein the first node frame receiver receives a frame with bytes scrambled in the first location and unscrambled bytes in the second location;

wherein the first node frame receiver reads the overhead bytes in the second location;

wherein the first node frame generator transmits the frame with the scrambled bytes in the first location to the second node receiver; and wherein the second node frame receiver receives the frame with the scrambled bytes in the first location.

46. The system of claim 45 wherein the first node frame receiver replaces the overhead bytes in the second location; and wherein the first node frame generator transmits the frame with the scrambled overhead bytes in the first location.

* * * * *